(12) United States Patent
Casey

(10) Patent No.: US 10,982,418 B2
(45) Date of Patent: Apr. 20, 2021

(54) WATER TAP OR VALVE ASSEMBLY AND METHOD OF USE THEREOF

(71) Applicant: CASSELLIE LTD, Leeds (GB)

(72) Inventor: James Casey, Leeds (GB)

(73) Assignee: Cassellie Ltd., Leeds (GB)

( * ) Notice: Subject to any disclaimer, the term of this patent is extended or adjusted under 35 U.S.C. 154(b) by 0 days.

(21) Appl. No.: 16/349,755

(22) PCT Filed: Nov. 8, 2017

(86) PCT No.: PCT/GB2017/053356
§ 371 (c)(1),
(2) Date: May 14, 2019

(87) PCT Pub. No.: WO2018/087536
PCT Pub. Date: May 17, 2018

(65) Prior Publication Data
US 2019/0264428 A1    Aug. 29, 2019

(30) Foreign Application Priority Data
Nov. 14, 2016 (GB) .................................. 1619211

(51) Int. Cl.
*E03C 1/05* (2006.01)
*E03C 1/04* (2006.01)
*G05D 7/06* (2006.01)

(52) U.S. Cl.
CPC .............. *E03C 1/057* (2013.01); *E03C 1/041* (2013.01); *E03C 1/0411* (2013.01); *G05D 7/0617* (2013.01)

(58) Field of Classification Search
CPC ........ E03C 1/057; E03C 1/041; E03C 1/0411; E03C 1/04–05
USPC ....................................................... 4/678, 675
See application file for complete search history.

(56) References Cited

U.S. PATENT DOCUMENTS 6,315,208 B1    11/2001   Doyle
2012/0234409 A1  9/2012   Klicpera

FOREIGN PATENT DOCUMENTS

WO    2016040986 A1    3/2016

OTHER PUBLICATIONS

International Search Report and Written Opinion dated Jan. 25, 2018 issued in PCT/GB2017/053356.

Primary Examiner — Lori L Baker
(74) Attorney, Agent, or Firm — Renner, Otto, Boisselle & Sklar, LLP

(57) ABSTRACT

Water tap (2) or water valve assembly is provided which has biometric recognition means (20) provided on or associated with the same. The biometric recognition means (20) are arranged such that operation of the water tap (2) or water valve assembly and/or operation of one or more functions of the water tap (2) or water valve assembly takes place only upon recognition or a positive match of one or more biometric features of a user.

8 Claims, 9 Drawing Sheets

WATER TAP OR VALVE ASSEMBLY AND METHOD OF USE THEREOF

RELATED APPLICATIONS

This application is a national phase entry of International Application No. PCT/GB2017/053356 filed on Nov. 8, 2017 and published in the English language, which claims priority to GB Application No. 1619211.4 filed Nov. 14, 2016, both of which are hereby incorporated by reference.

FIELD OF THE INVENTION

This invention relates to a water tap or valve assembly and to a method of use thereof.

BACKGROUND

There is a known safety issue associated with any water tap or valve arrangement that allows hot or boiling water to be dispensed from the same due to the risk of a user accidentally burning themselves on the water being dispensed therefrom. In an attempt to overcome this problem, it is known to provide a safety button on the tap or valve arrangement that needs to be actuated in order for the thermostatic control of the tap or valve arrangement to be adjusted. One such example is a red button provided on a thermostatic shower mixer tap. The user has to knowingly actuate the button in order to allow hot water to be dispensed using the tap. This helps to remove the risk of a user accidentally increasing the temperature of the water. The safety button is particularly advantageous when a user is a child or an elderly person.

SUMMARY

However, a problem with the abovementioned arrangement is that a child or elderly person could still actuate the safety button, either by accident or deliberately, thereby increasing the risk that a user could burn themselves on the water being dispensed from the water tap or valve assembly. A similar problem is encountered with boiler taps. In addition, it is noted that the safety button arrangement can fail due to failure of a mechanical component associated with the same.

It is therefore an aim of the present invention to provide a water tap or valve assembly that overcomes the abovementioned problems.

It is a further aim of the present invention to provide a method of using a water tap or valve assembly that overcomes the abovementioned problems.

According to a first aspect of the present invention there is provided a water tap or water valve assembly, wherein biometric recognition means are provided on or associated with the water tap or water valve assembly and are arranged such that operation of the water tap or water valve assembly and/or operation of one or more functions of the water or water valve assembly takes place only upon recognition or a match of one or more biometric features of a user.

Thus, the present invention provides an improved security feature which only allows authorised or known users to operate the water tap or valve assembly or operate one or more functions of a water tap or valve assembly, such as for example a hot or boiling water function of the water tap or valve assembly in use.

Preferably operation of the water tap or water valve assembly and/or one or more functions thereof requires a positive or successful match or recognition of one or more biometric features of a user with respect to one or more biometric features of a user that are already known, registered and/or pre-stored in association with the tap, valve assembly and/or biometric recognition means. However, it is noted that the biometric recognition means could be set up to recognise one or more biometric features of a user or users who are not allowed to use the water tap or water valve assembly and/or one or more functions thereof. For example, one or more child's biometric features could be known, registered and/or pre-stored in association with the tap, valve assembly and/or biometric recognition means, such that the child is prevented from using the same but one or more biometric features of any other user detected allows operation of the water tap, water valve and/or one or more functions thereof.

Preferably data storage means and/or memory means are provided on or associated with the water tap, water valve assembly and/or biometric recognition means to allow one or more biometric features of a user to be registered or pre-stored therewith.

Preferably the biometric recognition means is any one or more devices, sensors or mechanisms that are arranged to recognise one or more biometric characteristics or features of a user so as to allow determination of whether the user is authorised or not to use the water tap or valve assembly or one or more functions of the water tap or valve assembly.

Preferably the one or more biometric characteristics or features recognisable by the biometric recognition means include or consist of one or more characteristics that are unique to a particular, specific, known or pre-recorded user.

In one embodiment the one or more biometric characteristics or features recognisable by the biometric recognition means include any or any combination of a fingerprint, facial recognition, DNA, palm print, hand geometry, iris recognition, retina recognition and/or the like.

In one embodiment the biometric recognition means can be provided on a body portion or main body portion that is integral with, forming part of or associated with the tap or valve assembly.

In one embodiment the biometric recognition means can be provided on a unit separate to and/or remote from the body portion or main body portion of the tap or valve assembly.

Preferably the biometric recognition means includes any device, sensor and/or mechanism that allows one or more biometric characteristics or features of a user to be detected, recorded and/or stored on or associated with the same, which allows matching or the detection of a match of one or more user's biometric characteristic or features to one or more pre-stored biometric characteristics or features of the user in use and/or which allows verification of a match of a user's biometric characteristics or features to one or more pre-stored biometric characteristics or features of the user.

In one embodiment the tap or valve assembly includes user actuation means or device to allow actuation of the tap and/or valve assembly in use.

Preferably actuation of the user actuation means allows the tap or valve assembly to be moved between an "on" or "open" condition, wherein water can be dispensed from the tap or valve assembly in use, and an "off" or "closed" condition, wherein water is prevented or substantially prevented from being dispensed from the tap or valve assembly in use.

In one embodiment the user actuation means are separate and distinct to the biometric recognition means.

In one embodiment the user actuation means are linked to, form part of or are integral with the biometric recognition means.

Preferably the user actuation means includes any or any combination of one or more handle means, gripping means, switches, buttons, sensor means (i.e. movement sensor means) and/or the like.

In one embodiment the gripping means includes one or more protruding portions provided on the handle means, tap or valve assembly and/or the like.

In one embodiment the tap or valve assembly includes outlet means for dispensing water from the same in use.

Preferably the outlet means includes any or any combination of one or more spouts, apertures, channels, sleeves, conduits, pipes and/or the like.

In one embodiment the tap or valve assembly has inlet means for allowing water to enter the tap or valve assembly in use.

Preferably the inlet means includes any or any combination of one or more apertures, channels, sleeves, conduits, pipes and/or the like.

In one embodiment the tap or valve assembly or inlet means is arranged to allow attachment to a mains water supply, a hot water supply and/or a cold water supply in use.

In one embodiment display means are provided on or associated with the tap or valve assembly to allow display of one or more data items associated with the tap or valve assembly, such as for example, to display the temperature of the water being dispensed or to be dispensed from the assembly, to display a set up menu to allow set up of the biometric recognition means, to allow recording, detection and/or verification of a biometric characteristic or feature of a user and/or the like.

Preferably the display means is in the form of a display screen, Liquid Crystal Diode (LCD) display, touch screen display and/or the like.

Preferably control means are provided on or associated with the tap or valve assembly to allow control and/or adjustment of the temperature of the water being dispensed from the tap or valve assembly in use.

Preferably the control means includes one or more buttons, switches, scroll means, knobs, levers, handles and/or the like.

In one embodiment the control means are only operable following positive or successful biometric recognition of a user by the biometric recognition means.

Preferably the control means includes or consists of any or any combination of electronic control means or mechanism, mechanical control means or mechanism, pneumatic control means or mechanism, hydraulic control means or mechanism and/or the like.

Preferably micro-processing means are provided in or associated with the water tap, water valve assembly and/or biometric recognition means to allow processing of one or more signals to and/or from the biometric recognition means, the display means, the control means and/or the like.

Preferably the one or more signals are one or more data signals, digital data signals and/or the like.

In one embodiment the biometric recognition means, the control means and the display means are provided on the same body portion or unit.

In one embodiment power means are provided on or associated with the tap or valve assembly for providing electrical power to one or more components of the same in use.

Preferably the power means are movable between an "on" condition, wherein power is supplied to the tap or valve assembly and/or any component thereof, and an "off" condition, wherein power is not supplied to the tap or valve assembly and/or to any or one or more components thereof.

Preferably the power means includes any or any combination of battery power supply, mains power supply, solar power, generator power and/or the like.

In one embodiment the biometric recognition means is in the form of fingerprint recognition means or device.

In one embodiment the fingerprint recognition means or device includes any or any combination of a fingerprint detection element for detecting a user's fingerprint, optical means or device for allowing an image of a user's fingerprint to be taken in use, sensor means or device for capturing an electronic or digital image of a user's fingerprint, digital camera means or device, ultrasonic sensor means or device, capacitance sensor and/or the like.

Preferably the fingerprint recognition means or device is arranged to detect at least one of a number of patterns and/or features of a user's fingerprint, such as for example an arch, loop, whorl, minutiae based matching, minutiae based algorithm and/or the like.

Preferably a user's fingerprint image or detected biometric data is used to determine whether or not the user is authorised to use the tap or valve assembly or to use one or more functions of the tap or valve assembly in use. Preferably this determination is done by verifying whether the user's fingerprint image or detected biometric fata is a match for a pre-stored fingerprint image or biometric data in or associated with the fingerprint recognition means or biometric recognition means.

Preferably micro-processing means are provided in or associated with the fingerprint or biometric recognition means to allow processing of one or more signals generated by the finger or biometric recognition means in use and/or for allowing actuation of the tap or valve assembly in use.

Preferably the fingerprint or biometric recognition means only allows user actuation of the tap and/or valve assembly if a positive, successful or identical match is identified between a user's fingerprint or biometric data detected by the fingerprint or biometric recognition means and a pre-stored user's fingerprint or biometric data.

In one embodiment the tap or valve assembly can have one or more functions, such as for example, to allow dispensing of cold water, to allow dispensing of hot water, to allow dispensing of boiling water, the ability to change the temperature of the water being dispensed and/or the like.

In one embodiment one or more functions of the tap or valve assembly may be possible without use of the fingerprint or biometric recognition means. For example, it could be possible for a user to actuate the cold and/or hot water function of the tap or valve assembly without operation of the fingerprint or biometric recognition means.

In one embodiment the tap or valve assembly requires user recognition by the fingerprint or biometric recognition means prior to the user being allowed to actuate the hot water, to dispense water above a pre-set or predetermined threshold temperature, to allow the temperature of the water being dispensed to be changed and/or to actuate a boiling water function of the tap or valve assembly.

In one embodiment use of the biometric recognition means is compulsory in order to allow actuation of the tap or valve assembly.

In one embodiment use of the biometric recognition means is optional, depending on the user's requirements, as to whether it is required to allow actuation of the tap or valve assembly. Thus, for example, the user is able to select whether the biometric recognition means is operational or not for operation of the tap or valve assembly.

In one embodiment the tap or valve assembly requires user recognition by the fingerprint or biometric recognition means prior to the user being allowed to use any function of the tap or valve assembly.

Preferably a user can store fingerprint record or a biometric record by following a suitable set up or registration procedure on and/or associated with the fingerprint or biometric recognition means.

Preferably the fingerprint and/or biometric data is stored as digital data, one or more digital signals and/or as a digital data file.

In one embodiment the water tap includes or is associated with a water valve assembly.

According to a second aspect of the present invention there is provided a method of using a water tap or water valve assembly, said method including the steps of registering or storing one or more biometric features of a user, detecting one or more biometric features of a user using biometric recognition means provided on or associated with the water tap or water valve assembly, and wherein upon a positive or identical match of the detected biometric features with the stored or registered biometric features, allowing operation of the water tap or water valve assembly and/or operation of one or more functions of the water or water valve assembly.

BRIEF DESCRIPTION OF THE DRAWINGS

Embodiments of the present invention will now be described with reference to the following figures, wherein.

DETAILED DESCRIPTION

Figure 1:
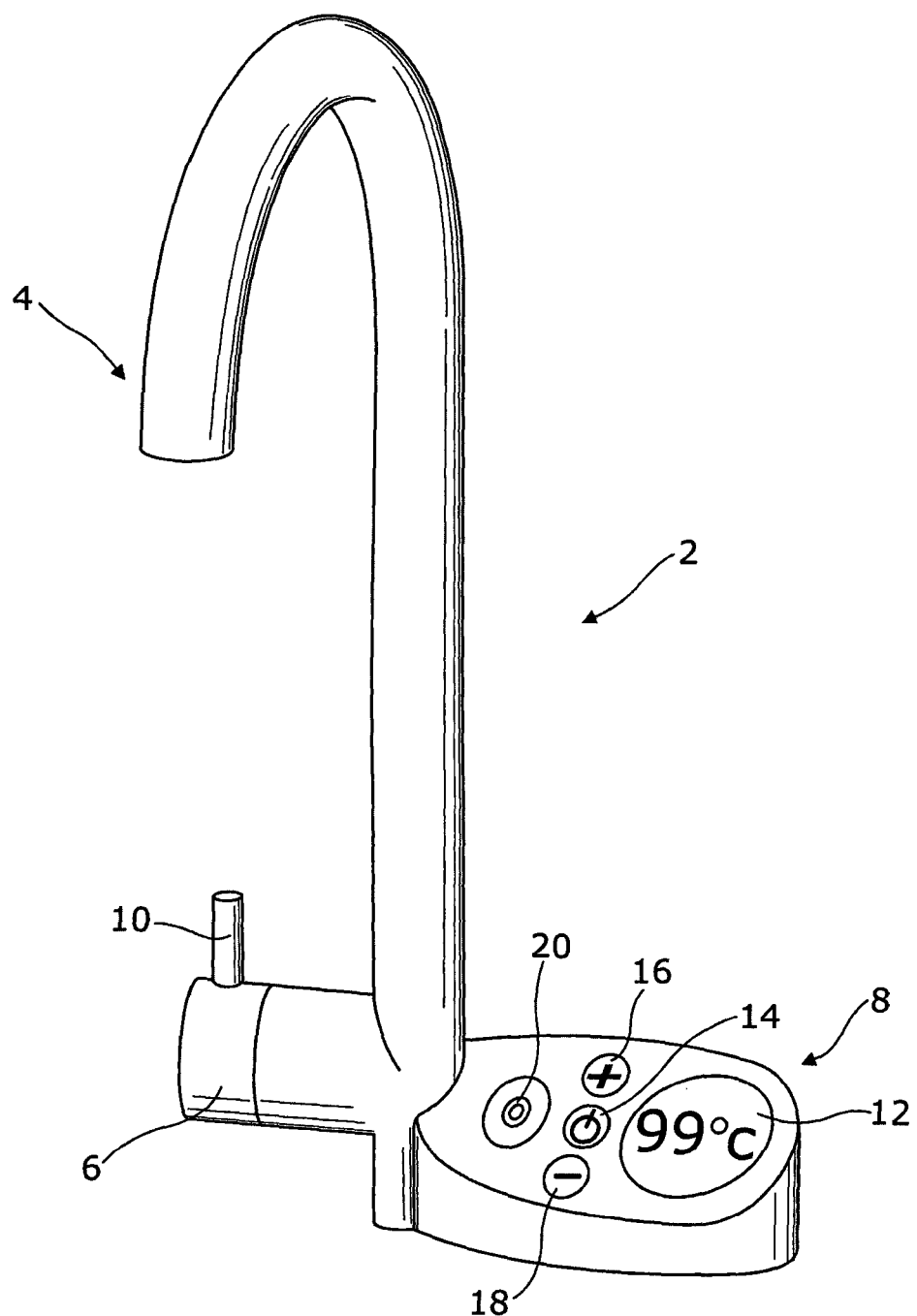
FIGS. 1-9 each show a perspective view of a water tap including fingerprint recognition means according to different embodiments of the present invention.
Figure 2:
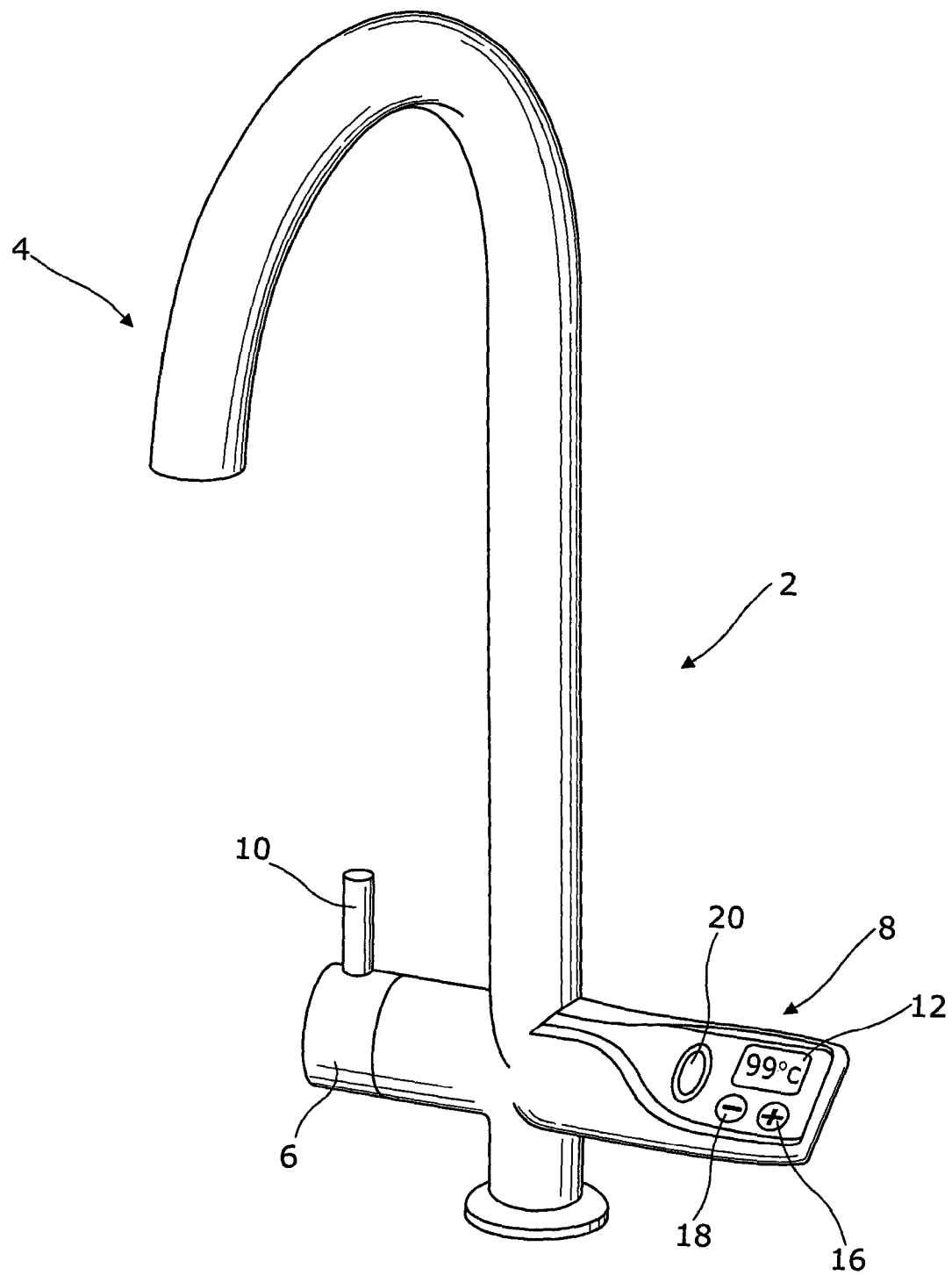
Figure 3:
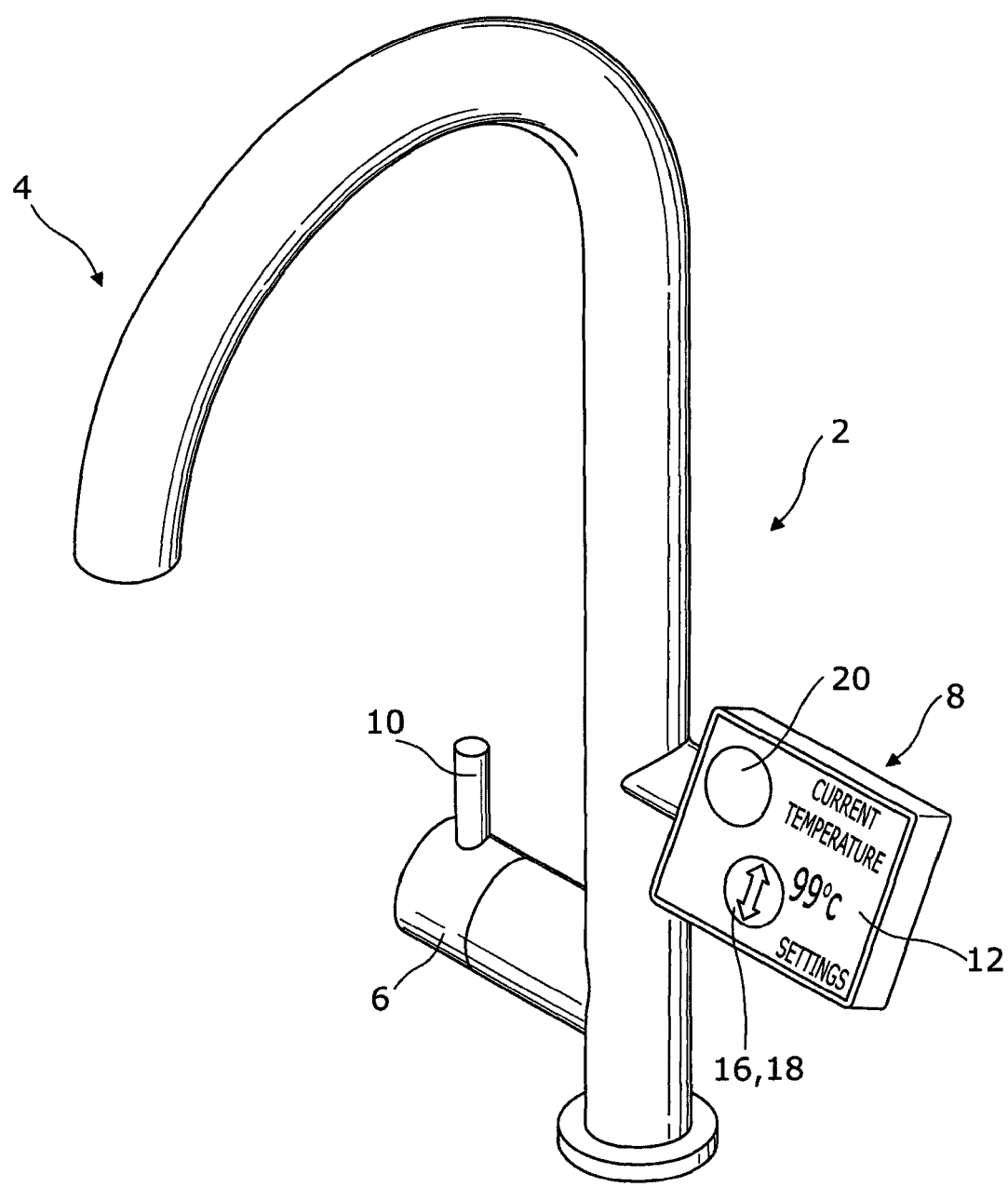

Referring to FIGS. 1-3, there are illustrated water taps 2 having water dispensing outlet means in the form of a spout 4, user actuation means in the form of a rotatable handle 6 and a display portion 8. The tap 2 is typically arranged at a suitable location on or adjacent a sink, faucet, basin, worksurface and/or the like in use.

In the illustrated examples the spout 4, handle 6 and display portion 8 form a single tap unit. However, it will be appreciated that the spout, handle and/or display portion could be separate if required.

It will be appreciated that the water dispensing outlet means or spout, the tap, the handle and/or the display portion can be any suitable size, shape and/or design.

The rotatable handle 6 includes an outwardly protruding gripping portion 10 to allow a user to easily grip and actuate the rotatable handle 6 in use. The handle 6 is movable between an "off" condition, wherein water cannot be dispensed from the spout 4, to an "on" condition, wherein water can be dispensed from the spout 4 in use. Actuation of handle 6 typically actuates a valve arrangement located internally of the tap which is not shown.

The display portion 8 is attached to the main body portion of the tap 2. It includes a temperature display 12 which displays the water temperature that will be dispensed from tap 2 when in the "on" condition in use. An "on"/"off" power operational button 14 is provided which allows the tap, or at least the heating element of the tap, to be moved between "on" and "off" operational conditions in use, a "+" button 16 to allow the temperature of the water being dispensed from the tap to be increased in use, and a "−" button 18 to allow the temperature of the water being dispensed from the tap to be decreased in use. In addition, in accordance with the present invention, a fingerprint sensor 20 is provided on display portion 8 to allow detection, recordal and/or verification of a user's fingerprint in use, and particularly to allow detection, recordal and/or verification of specific characteristic features of a user's fingerprint in use.

In one embodiment the tap 2 can be arranged to only dispense water below a pre-determined temperature, such as for example below 38° C., when the handle 6 is in the "on" condition unless a fingerprint recognition process is positively or successfully undertaken by a user. If a positive or successful fingerprint recognition process is undertaken, for example a user's fingerprint detected by sensor 20 matches identically a pre-stored user's fingerprint, then the user is able to change, increase, or decrease the temperature of the water being dispensed from tap 2.

In one embodiment the tap 2 may not dispense water from the same at any temperature, irrespective of whether the handle is in an "on" condition or not, unless a fingerprint process is positively or successfully undertaken by a user.

Micro-processing means are typically provided with or associated with the display portion 8 to allow actuation and/or control of the power button 14, the temperature adjustment button or buttons 16, 18 and/or the fingerprint sensor 20.

The micro-processing means can be provided in the display portion 8 or could be provided remote to the display portion 8, such as underneath a sink or worksurface associated with the tap 2 in use.

The micro-processing means and/or the elements on the display portion can be powered by mains power, generator power, solar power, battery power and/or the like.

In one method of operation of the present invention, once the power button 14 has been moved to an "on" or operational condition, a user can have access to a user menu, such as for example, by holding the temperature + or − buttons 16, 18 down together. Access to the user menu could be protected by requiring input of a user's pin or unique code if required.

There are a number of ways in which a user who wishes to be authorised to use the tap in use could store their fingerprint data in memory associated with the micro-processing means.

An example of one method is where the user scans an image of one of their fingers a pre-determined number of times, such as for example three times, using the fingerprint sensor 20 during a recognition option in the user menu. The display portion 8 could confirm user fingerprint registration once the process has been successfully completed.

Once a user has been registered as being an "authorised user" for the tap, in order to adjust a temperature of the tap in use, the user places their authorised finger on the fingerprint sensor 20 (when the display portion was in a power "on" operational condition) and await recognition of their fingerprint by the micro-processing means. On recognition of the fingerprint as belonging to an authorised registered user, the user is then able to increase or decrease the temperature of the water being dispensed from the tap using the buttons 16, 18. If the micro-processing means does not recognise the user as being an authorised registered user, the user is not able to adjust the temperature of the water being dispensed from the tap.

In an alternative method, hot or cold water is only dispensed from the tap 2 on recognition of an authorised registered user's fingerprint by the fingerprint sensor 20 and the micro-processing means.

It will be appreciated that variations in the methodology for detecting the user's fingerprint, recording the user's fingerprint, verifying the user's fingerprint as being a match and/or operation of the tap and/or temperature control for the tap are possible without deviating from the scope of protection of the present invention.

Thus, it can be seen that the present invention provides increased security for a water tap or valve assembly in order to prevent unwanted users from activating and/or accessing hot or boiling water. The present invention provides an alternative method to the conventional safety button method applied to many taps or thermostatic valves in the marketplace currently. The present invention also has the advantage that it is easier to use for less able users, such as elderly or disabled users, compared to conventional mechanically actuated safety buttons.

FIGS. 4-9 show further examples of water tap assemblies according to the present invention.

Figure 4:
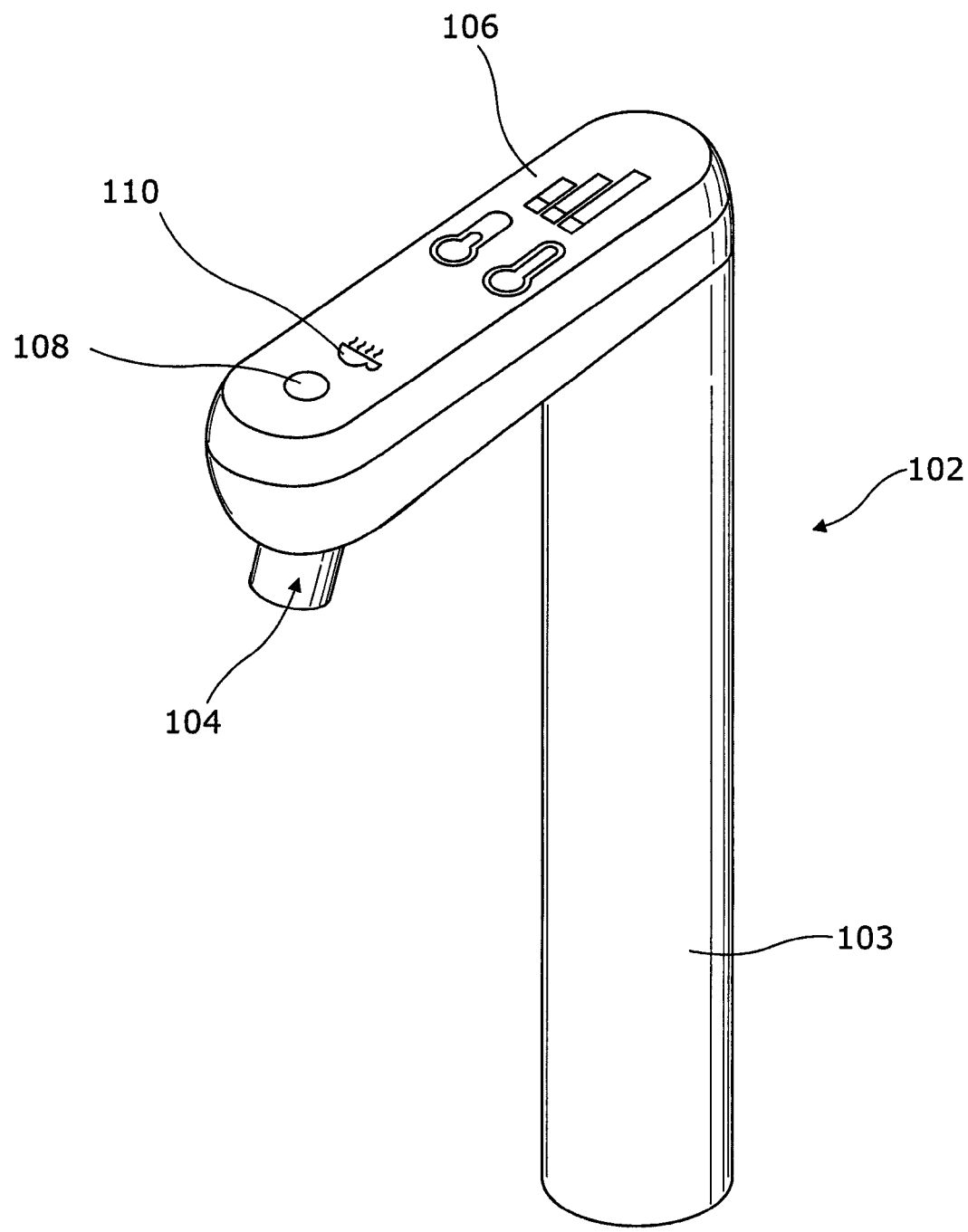

FIG. 4 shows a water tap 102 having an upright body portion 103, a spout 104 for allowing water to be dispensed from the same in use, and a display portion 106 associated with the top of tap 102. The display portion 106 is a touch screen display portion and so a user presses said display 106 in order to actuate one or more functions of the tap, such as moving the tap between a dispensing or "on" condition and a non-dispensing or "off" condition, for changing the temperature of the water being dispensed and for activating the fingerprint sensor 108. An icon of a tea cup 110 is shown so that water can be dispensed therefrom at a temperature suitable for making a hot drink.

Figure 5:
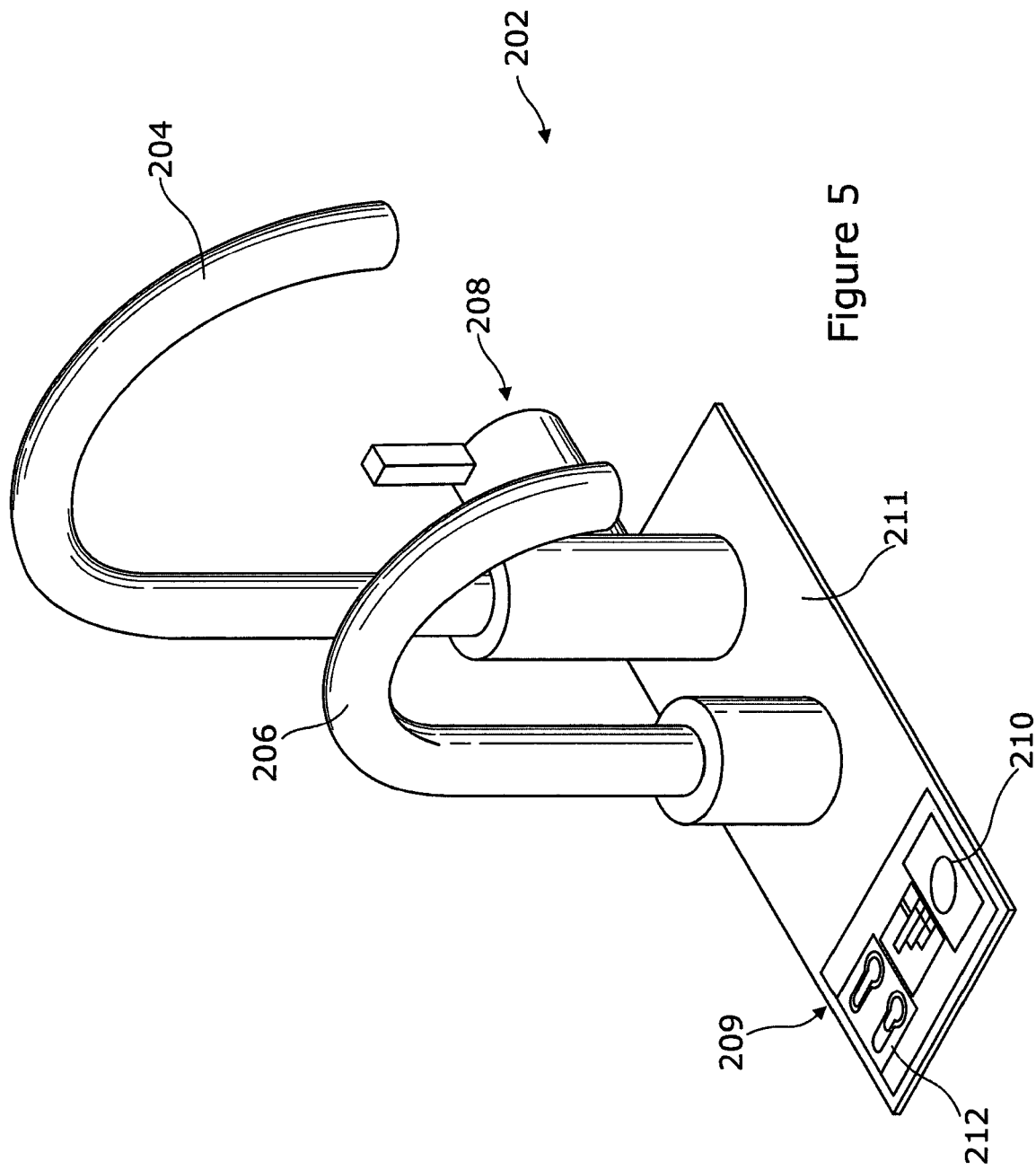

FIG. 5 shows a further example of a water tap 202 having two spouts 204, 206 for dispensing water therefrom. An actuation handle 208 is provided with spout 204 for dispensing cold water in a conventional manner through spout 204. Spout 206 is for dispensing hot water therefrom and is actuated via display portion 209. The spouts 204, 206 and display portion 209 are mounted on a plate member 211.

A fingerprint sensor 210 is provided on display portion 209 to allow authorized actuation of hot dispensing from spout 206 in use. Thermometer icons 212 on display portion 209 typically allow a user to adjust the temperature of the water being dispensed from spout 206.

Figure 6:
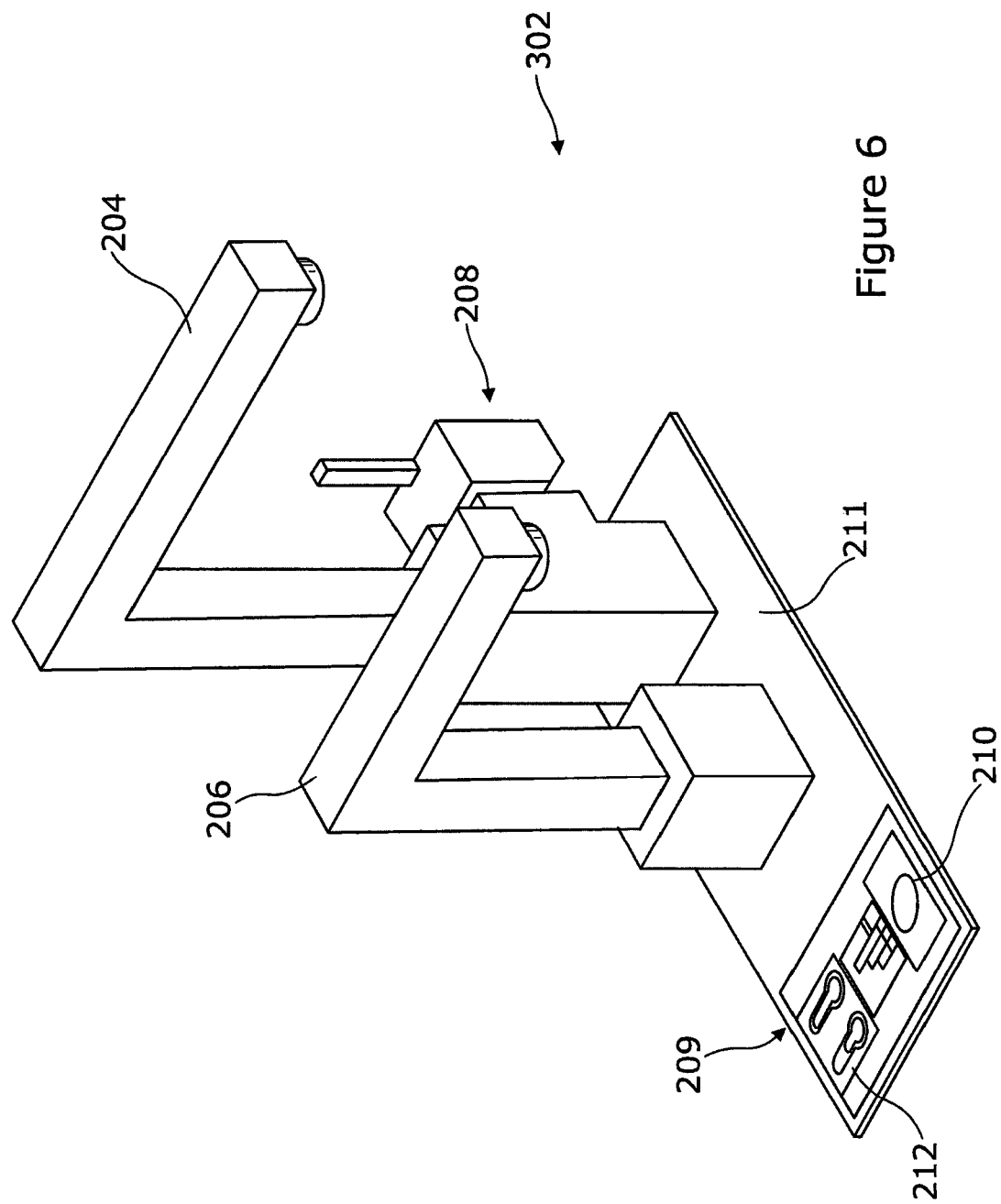

The water tap 302 shown in FIG. 6 is similar in design to water tap 202 shown in FIG. 5 apart from the shape of the spouts and actuation handle.

Figure 7:
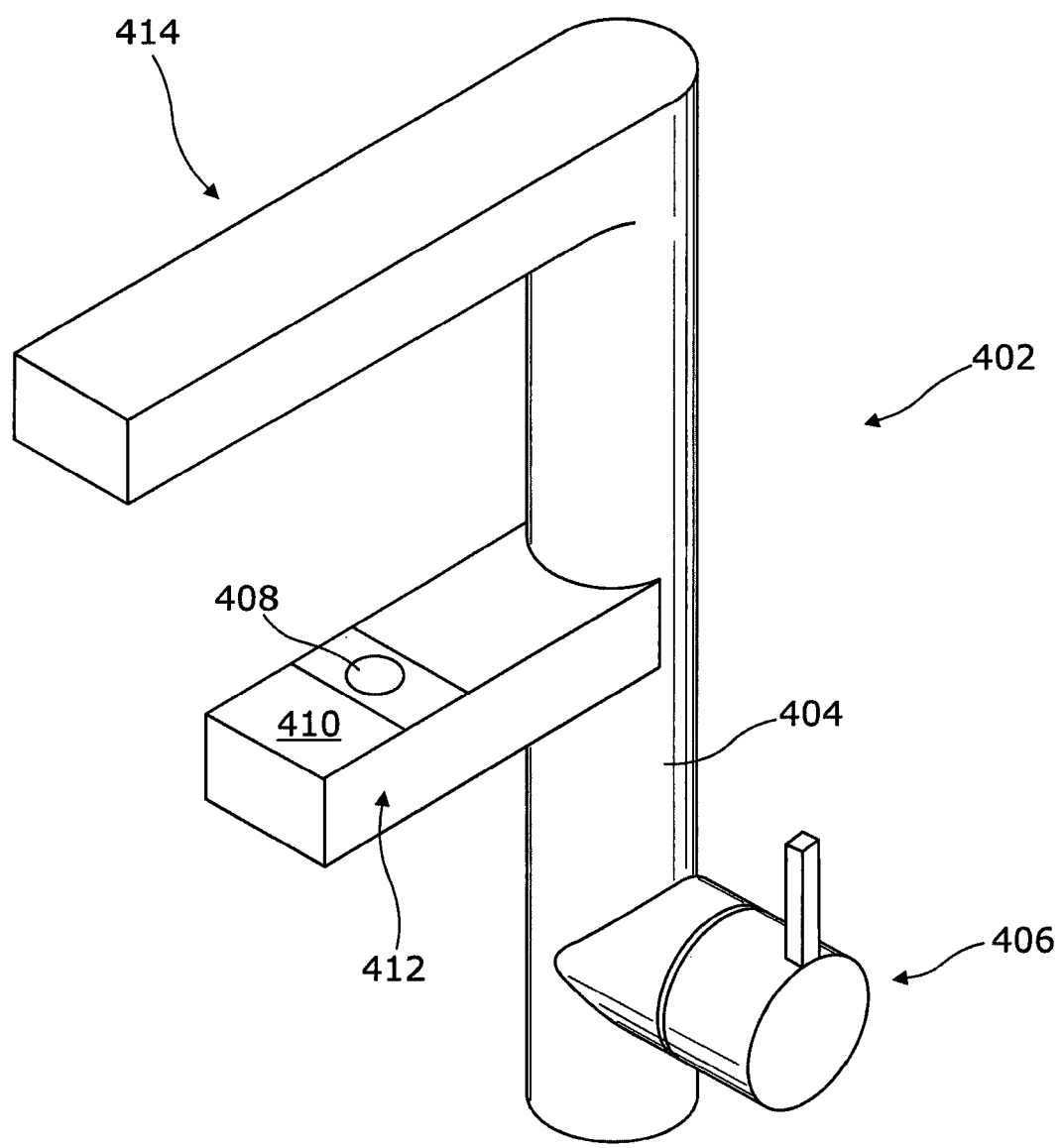
Figure 8:
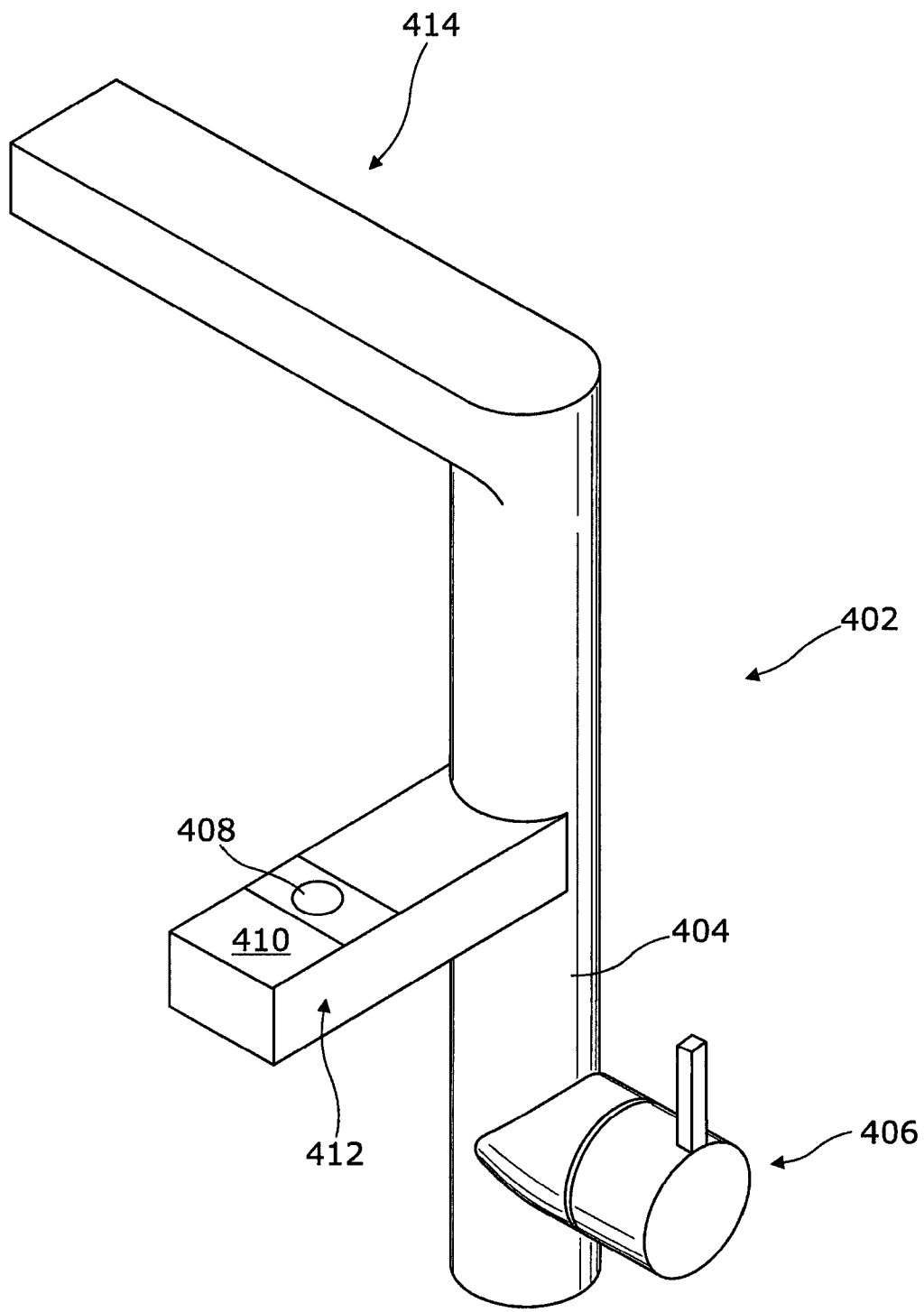
Figure 9:
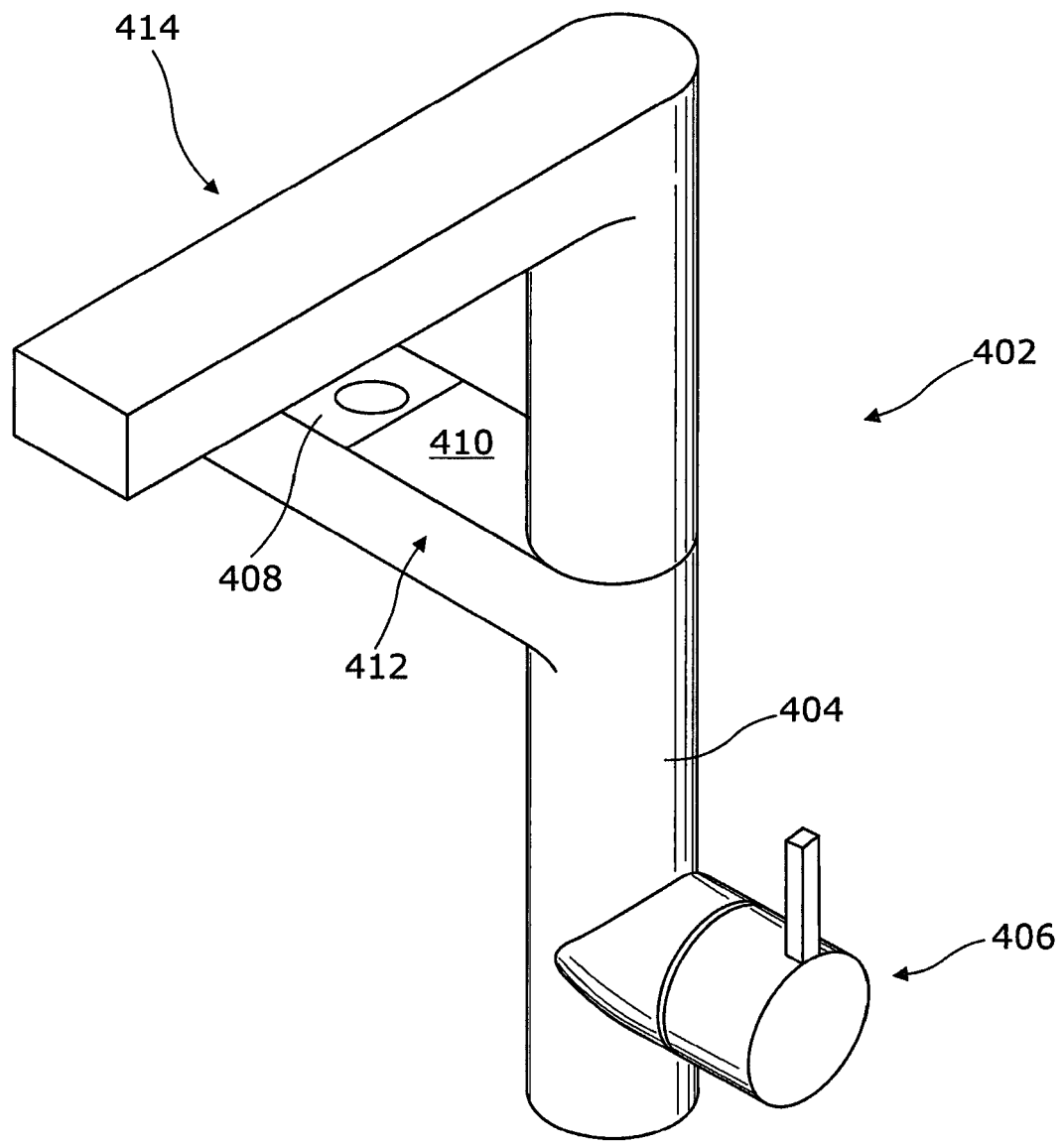

FIGS. 7-9 show different views of a tap 402 having an upright stem portion 404. Actuation handle 406 protrudes outwardly from a lower part of stem portion 404 to allow the tap 402 to be moved between "on" and "off" conditions in use in a conventional manner. Fingerprint sensor 408 is positioned on an upper surface 410 of a rotatably mounted arm member 412. The sensor 408 works in a manner similar to that already described above. Arm member 412 protrudes outwardly from a central location of stem portion 404, in this example is arranged to be perpendicular thereto, and is rotatable about a longitudinal axis of stem portion 404 in use to allow the same to be moved out of the way of a user or sink if required. In particular, arm member 412 is arranged to be moved through approximately 90 degrees between the positions shown in FIG. 7 and FIG. 9.

A spout 414 is located at a top of stem portion 404 and protrudes outwardly therefrom to allow water to be dispensed from tap 402 in use. The spout 414 is arranged to be rotatably moved through approximately 90 degrees in use to allow the spout to be moved out of the way of a user or sink of required, between the positions shown in FIG. 7 and FIG. 8.

It will be appreciated that any or any combination of the above described features could be provided on a tap or valve assembly according to the present invention.

The invention claimed is:

1. A water tap or a water valve assembly, comprising:
   an actuator configured to actuate the water tap or the water valve assembly; and
   a controller configured to control and/or adjust a temperature of water dispensed from the water tap or the water valve assembly, such that:
      when the temperature of the water is below a predetermined threshold temperature, actuation of the actuator causes the water to be dispensed without requiring positive or successful recognition by a biometric recognition sensor provided on or associated with the water tap or water valve assembly; and
      when the temperature of the water is above the predetermined threshold temperature, actuation of the actuator causes the water to be dispensed only with a positive or successful recognition by the biometric recognition sensor.

2. The water tap or a water valve assembly according to claim 1 wherein the one or more biometric features recognizable by the biometric recognition sensor include any or any combination of a user's fingerprint, facial recognition, DNA, palm print, hand geometry, iris recognition or retina recognition.

3. The water tap or a water valve assembly according to claim 1 wherein the biometric recognition sensor is provided on a body portion integral with, forming part of, or associated with the water tap or water valve assembly.

4. The water tap or a water valve assembly according to claim 1 wherein the biometric recognition sensor is provided on a unit separate to and/or remote from a main body portion or the water tap or the water valve assembly.

5. The water tap or a water valve assembly according to claim 1 wherein the biometric recognition sensor includes any device, sensor and/or mechanism that allows one or more biometric features of a user to be detected, recorded and/or stored on or associated with the same; which allows matching or detection of a match of one or more user's biometric features to one or more pre-stored biometric features of the user; and/or which allows verification of a match of one or more user's biometric features to one or more pre-stored biometric features of the user.

6. The water tap or a water valve assembly according to claim 1 wherein a display is provided on or associated with the water tap or water valve assembly to allow the display of one or more data items associated with the water tap or water valve assembly, the temperature of the water being dispensed or to be dispensed from the water tap or water valve assembly, a set up menu to allow set up of the biometric recognition sensor, and/or to allow recording, detection and/or verification of a biometric feature of a user.

7. The water tap or a water valve assembly according to claim 6, wherein the display is in the form of a display screen, LCD display and/or touch screen display.

8. The water tap or a water valve assembly according to claim 1 wherein a micro-processor is provided on or associated with the water tap, water valve assembly and/or biometric recognition sensor to allow processing of one or more signals to and/or from the biometric recognition sensor, the display, and/or controller.

* * * * *